United States Patent [19]

Reiff et al.

[11] 4,337,333
[45] Jun. 29, 1982

[54] SUBSTITUTED POLYISOCYANATE OR POLYISOCYANATE MIXTURES OF THE DIPHENYL METHANE SERIES CONTAINING CHLOROSULFONYL GROUPS

[75] Inventors: Helmut Reiff; Dieter Dieterich, both of Leverkusen, Fed. Rep. of Germany

[73] Assignee: Bayer Aktiengesellschaft, Leverkusen, Fed. Rep. of Germany

[21] Appl. No.: 200,638

[22] Filed: Oct. 27, 1980

[30] Foreign Application Priority Data

Nov. 14, 1979 [DE] Fed. Rep. of Germany ....... 2945867

[51] Int. Cl.$^3$ .................. C08G 18/76; C07C 119/048
[52] U.S. Cl. ............................. 528/67; 260/453 AM; 260/456 P; 521/160; 521/162; 528/44; 564/49
[58] Field of Search ................ 260/453 AM; 528/44, 528/67; 521/160, 162

[56] References Cited

U.S. PATENT DOCUMENTS

| 4,119,658 | 10/1978 | Dieterich | 260/453 AR |
| 4,147,653 | 4/1979 | Dieterich | 252/182 |

FOREIGN PATENT DOCUMENTS

| 947159 | 7/1956 | Fed. Rep. of Germany . |
| 1793407 | 2/1972 | Fed. Rep. of Germany . |

OTHER PUBLICATIONS

Hauben Weyl, 4th Edition, vol. 9, pp. 563–585, Herstellung Aromatischer Sulfonsaurechloride.

*Primary Examiner*—Dolph H. Torrence
*Attorney, Agent, or Firm*—Gene Harsh; Joseph C. Gil; Lyndanne M. Whalen

[57] ABSTRACT

The instant invention is directed to a substituted polyisocyanate or polyisocyanate mixtures of the diphenyl methane series containing chlorosulfonyl groups, a process for the preparation thereof and the use thereof for the preparation of polyisocyanate polyaddition compounds.

13 Claims, No Drawings

SUBSTITUTED POLYISOCYANATE OR POLYISOCYANATE MIXTURES OF THE DIPHENYL METHANE SERIES CONTAINING CHLOROSULFONYL GROUPS

BACKGROUND OF THE INVENTION

Isocyanatoaryl sulfochlorides are known. According to German Pat. No. 947,159, they are prepared by the phosgenation of aromatic aminosulfonic acids. This process has the disadvantage that it requires the use of high boiling solvents (such as dichlorobenzene and, in particular, nitrobenzene) and that the aminosulfonic acids used as starting material are difficult to dissolve in these solvents, even at the high reaction temperatures employed. The reaction is therefore lengthy and the yield of isocyanatoaryl sulfochlorides obtained is unsatisfactory. This applies particularly to the preparation of diisocyanatoaryl sulphochlorides, one of which was obtained in only 46% of the theoretical yield in Example 3 of the above-mentioned reference. Due to these disadvantages, the process has not achieved a position of technical importance.

It is also known to prepare simple aryl sulfochlorides by the sulfonation of aromatic compounds, e.g., with chlorosulfonic acid or mixtures of chlorosulfonic acid and sulfuryl chloride (see, e.g., Houben Weyl, 4th Edition, Volume 9, pages 563–585). It is also known to prepare sulfochlorides from free sulfonic acids or salts thereof with acid chlorides. These processes which are known from the literature have hitherto not been used or only used with negative results, for the preparation of isocyanatosulfochlorides from isocyanates. This is due to various causes.

Firstly, sulfochlorination with chlorosulfonic acid requires an excess of this reagent and therefore requires working-up to be carried out in the presence of water, which causes decomposition of the isocyanate groups. Secondly, isocyanatosulfonic acids have only become known very recently and have proved to be extremely difficult to handle and extremely reactive. Furthermore, it is known that sulfonic acid groups react in an uncontrollable manner with isocyanates at elevated temperatures with elimination of $CO_2$. Thus, under the conventional reaction conditions, the preparation of sulfochloride is liable to be accompanied to a considerable extent by other reactions including sulfone formation and anhydride formation, as well as polymerization reactions of the isocyanate group.

Isocyanatoaryl sulfochlorides containing at least two isocyanate groups, and particularly derivatives of the commercially important diphenyl methane series would, however, be interesting substances with a considerable potential for practical application since:

(1) they should have an even lower vapor pressure than the unmodified diisocyanate;
(2) they have a higher polarity than the unmodified diisocyanate; and
(3) the hydrolysis products thereof (aromatic diaminosulfonic acids) are presumably non-toxic.

It was therefore an object of the present invention to provide polyisocyanates or polyisocyanate mixtures of the diphenyl methane series containing chlorosulfonyl groups and a process for the preparation thereof which could be carried out on a commercial scale. It was surprisingly found that, in spite of the difficulties which were to be expected, this problem could be solved by the process according to the present invention, which is described below. Furthermore, the compounds according to the present invention were found to be valuable starting materials for the preparation of polyisocyanate polyaddition products, not only embodying the above-mentioned advantages, but also imparting improved flame resistance to the polyaddition products produced therefore.

DESCRIPTION OF THE INVENTION

The present invention thus relates to substituted polyisocyanates or polyisocyanate mixtures of the diphenyl methane series, characterized by containing from 2 to 50%, by weight, of chlorosulfonyl groups.

The present invention particularly relates to diisocyanates containing chlorosulfonyl groups corresponding to the following general formula:

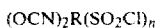

wherein
R represents a hydrocarbon group obtained by the removal of two isocyanate groups and n hydrogen atoms from a diisocyanato diphenyl methane or a mixture of diisocyanato diphenyl methane isomers; and
n represents 1 or 2.

The present invention also relates to a process for the preparation of the present polyisocyanates or polyisocyanate mixtures, comprising reacting, successively or simultaneously, polyisocyanates or polyisocyanate mixtures of the diphenyl methane series containing at least two isocyanate groups at from 0° to 160° C., with (a) from 0.2 to 2.2 mol of sulfur trioxide or chlorosulfonic acid per 250 g of polyisocyanate; and
(b) from 0.3 to 22 mol of an inorganic acid chloride per 250 g of polyisocyanate;

and removing from the reaction mixture the hydrogen chloride produced.

Furthermore, the present invention relates to the use of the present polyisocyanates or polyisocyanate mixtures as components for the preparation of polyisocyanate polyaddition compounds.

Particularly preferred substituted polyisocyanates according to the present invention include: 4,4'-diisocyanato-3-chlorosulfonyl-diphenyl methane and 4,4'-diisocyanato-3,3'-bis-(chlorosulfonyl)-diphenyl methane.

The following are representative examples of isocyanates and isocyanate mixtures which may be used: 2,2'-diisocyanato-diphenyl methane, 2,4'-diisocyanato-diphenyl methane, 4,4'-diisocyanato-diphenyl methane, mixtures of these isomers, and polyisocyanate mixtures of the diphenyl methane series which may be obtained by aniline/formaldehyde condensation, followed by phosgenation. Such polyisocyanate mixtures suitable as starting material according to the present invention generally contain from 30 to 95%, by weight, preferably from 40 to 85%, by weight, of the diisocyanate diphenyl methane isomers in addition to higher functional polyisocyanates of the diphenyl methane series, i.e., tri-, tetra- and/or higher-functional polyisocyanates containing 3,4 and/or more than 4 aromatic rings linked through methylene bridges and each substituted by an isocyanate group.

Also suitable as starting materials according to the present invention are those diisocyanato-diphenyl methane isomers or polyisocyanate mixtures of the diphenyl methane series exemplified above which are present as mixtures with minor quantities of: (i) polyisocyanates containing carbodiimide groups, obtained by partial carbodiimidization of the isocyanate groups of these polyisocyanates; (ii) polyisocyanates containing urethane groups, obtained by partial urethanization of the isocyanate groups of these polyisocyanates, for example, using polypropylene glycols having molecular weights of from 134 to 700; (iii) polyisocyanates containing allophanate groups, obtained by partial allophanatization of the isocyanate groups of these polyisocyanates; (iv) biuret polyisocyanates, obtained by partial biuretization of the isocyanate groups of these polyisocyanates; and/or (v) polyisocyanates containing isocyanurate groups, obtained by partial trimerization of the isocyanate groups of these polyisocyanates. These mixtures, which may also be used as starting materials according to the present invention, but are less preferred, are polyisocyanate mixtures which have been modified, but which still contain as the main component thereof the first-mentioned diisocyanate-diphenyl methane isomers or polyisocyanate mixtures of the diphenyl methane series in the unmodified form. The terms "polyisocyanates of the diphenyl methane series" and "polyisocyanate mixtures of the diphenyl methane series" are used in the present context to include both the last-mentioned modified mixtures and the phosgenation products of aniline/formaldehyde condensation, as well as the above-mentioned diisocyanates.

Sulfur trioxide and/or chlorosulfonic acid is used in the reaction. The sulfur trioxide may be used in a liquid, dissolved or gaseous form, e.g., as sulfur trioxide diluted with nitrogen, or in the form of an addition compound with organic compounds. Examples of such addition compounds include the adducts of sulfur trioxide and dioxane, tetrahydrofuran, diethyl ether or dimethyl formamide. Sulfur trioxide is preferably used in the gaseous form. Any solvents used for sulfur trioxide must be inert both toward sulfur trioxide and toward isocyanate groups under the reaction conditions of the present process. Suitable solvents include, for example, halogenated or nitrogenated hydrocarbons, such as dichloroethane, tetrachloroethane, methylene chloride, chloroform, fluorotrichloromethane, nitromethane, nitrobenzene, diethyl ether, dioxane, tetrahydrofuran, sulfur dioxide, chlorobenzene or dichlorobenzene; or, preferably, excess quantities of the acid chlorides mentioned below.

Inorganic acid chlorides suitable for the conversion of organic sulfonic acid groups into sulfochloride groups include: thionyl chloride, sulfuryl chloride, phosphorous pentachloride, sulfur chloride and phosgene. Thionyl chloride is preferred when the present process is carried out on a laboratory scale and phosgene is preferred for carrying out the process on a commercial scale.

When the acid chlorides mentioned above are used in excess, they also function as the preferred solvents for carrying out the present process. When phosgene is used, one of the above-mentioned inert solvents is preferably used in addition.

The present process is preferably carried out in the presence of acylated amines, e.g., dimethyl formamide, diethyl formamide, dimethyl acetamide, formyl piperidine, acetyl piperidine and N-methyl pyrrolidone. Dimethyl formamide is the preferred catalyst. Pyridine and alkyl-substituted pyridines are also suitable catalysts.

The sulfonating agent, sulfur trioxide and/or chlorosulfonic acid, is generally used in a quantity of from 0.2 to 2.2 mol per 250 g (molecular weight of diisocyanato diphenyl methane: 250) of polyisocyanate. When specific diisocyanato monosulfonic acid chlorides are being prepared, the quantity of sulfonating agent used is generally from 1 to 1.2 mol per 250 g of polyisocyanate. When it is desired to introduce two sulfochloride groups into one molecule of diisocyanate, the quantity of sulfonating agent used is generally from 1.8 to 2.2 mol per 250 g of polyisocyanate. It is important to ensure that the sulfonating agent is used up quantitatively in the reaction with the polyisocyanate or that any excess is removed so that no sulfonating agent is left after the sulfonating reaction. Alternatively, the diisocyanate may be only partially sulfochlorinated by using less than the equivalent quantity of the aforesaid sulfonating agent.

For example, the sulfonating agent may be used in a quantity from only 0.2 to 0.9 mol per 250 g of polyisocyanate.

The inorganic acid chloride is used in excess compared with the sulfonating agent. It is generally used in from 1.5 to 10 times the molar quantity, based on the quantity of sulfonating agent used. The quantity of inorganic acid chloride used is therefore from 0.3 to 22 mol per 250 g of polyisocyanate used as starting material. If ca. 1 mol of sulfur trioxide is used per 250 g of polyisocyanate, the quantity of acid chloride used is preferably from 1.5 to 8 mol per 250 g of polyisocyanate.

The quantity of dimethyl formamide used as catalyst is generally from ca. 2 to 40 g per mol of sulfonating agent. A quantity of from 3 to 30 g is preferred. Since isocyanates are capable of reacting with dimethyl formamide to produce unwanted by-products, it would always be desirable to use as little dimethyl formamide as possible under the given reaction conditions.

The number of chlorosulfonyl groups in the end products of the present process may easily be calculated, both from elemental analysis (chlorine and sulfur values) and from stoichiometric calculations. Thus, for example, 4,4'-diisocyanato-3-chlorosulfonyl-diphenyl methane has a chlorosulfonyl group content of 28.5%, by weight, while 4,4'-diisocyanato-3,3'-bis-chlorosulfonyldiphenyl methane has a chlorosulfonyl group content of 44.4%, by weight.

The present process is generally carried out at a temperature of from 0° to 160° C., preferably from 5° to 100° C.

The present process is particularly suitable for the preparation of the following compounds:

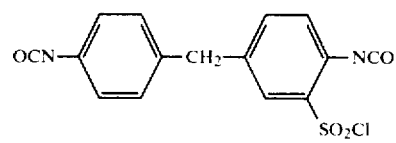

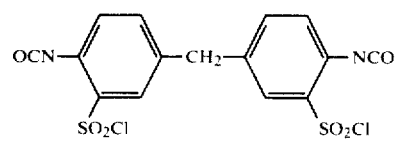

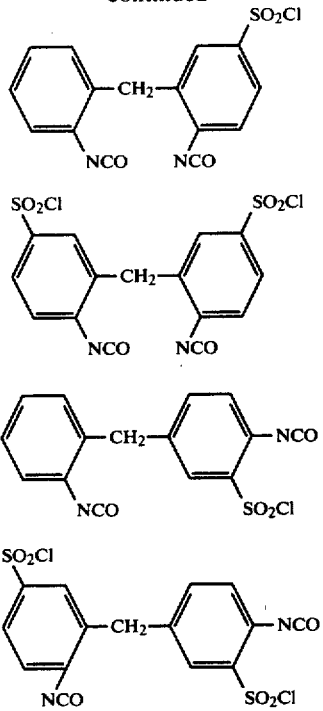

The process is also suitable for the preparation of mixtures of these isomers and, if less than the stoichiometric proportions are used, it is also suitable for the preparation of individual isomers or of isomer mixtures in excess polyisocyanates or polyisocyanate mixtures of the diphenyl methane series, Various procedures may be employed for carrying out the present process, as indicated below.

The sulfonating agent may be first added to the di- or higher polyisocyanate, followed by the acid chloride. In this embodiment of the process, the uretdiones of the corresponding isocyanatoaryl sulfonic acids are formed as intermediates, in most cases in the form of solid, insoluble compounds.

To ensure that the reaction mixture is stirrable, sulfonation must be carried out either in the presence of one of the inert solvents mentioned above or in the presence of an excess of di- or higher polyisocyanate. If from 0.7 to 2.2 mol of sulfonating agent is used per 250 g of polyisocyanate, the addition of a solvent is essential. Sulfonation is generally carried out at a temperature of from 0° to 80° C., preferably from 5° to 40° C.

It has been found advisable, when using chlorosulfonic acid as sulfonating agent, to pass nitrogen through the reaction mixture at from 40° to 80° C. until the hydrogen chloride has been completely removed.

The progress of this removal of hydrogen chloride may be followed by titration. The solvent may be partly or completely removed after sulfonation, e.g., by suction filtration, centrifuging or distillation. Solid isocyanatoaryl sulfonic acids in most cases rapidly go into solution after addition of the acid chloride in the presence of one of the above-mentioned catalysts. When phosgene is used as acid chloride, the solvent is preferably left in the reaction mixture.

When preparing bis-chlorosulfonyl derivatives (in a molar ratio of diisocyanate to sulfonating agent of ca. 1:2), the diisocyanate may be added to a mixture of solvent and sulfonating agent. Furthermore, a previously prepared diisocyanatoaryl monosulfonic acid may be further sulfonated in an excess of sulfonating agent, and the solid reaction product may be separated from excess sulfonating agent, for example, by means of an inert solvent, and then mixed with the inorganic acid chloride.

In another embodiment of the present process, the di- or higher polyisocyanate is first mixed with the inorganic acid chloride, and the sulfonating agent is then added. In this case, the acid chloride also serves as solvent so that no additional solvent need be added. Another advantage of this embodiment of the process is that the diisocyanato sulfonic acid formed as intermediate immediately reacts with the acid chloride, and little or no precipitate is formed during the reaction.

The sulfonating agent and the inorganic acid chloride may both be reacted with the di- or higher polyisocyanate simultaneously, for example, by using a solution of chlorosulfonic acid in thionylchloride. It is particularly preferred to react a diisocyanate with phosgene and to sulfonate it during phosgenation.

As mentioned above, the quantity of sulfonating agent used in the present process is generally calculated to provide from 0.2 to 2.2 mol of sulfonating agent per 250 g of polyisocyanate. A larger excess of sulfonating agent may be used if the sulfonating reaction is carried out in a separate step and the excess sulfonating agent is removed after the reaction. Since the product of sulfonation is generally a solid substance which precipitates from the liquid reaction medium, the excess sulfonating agent may be removed by, for example, washing with an inert solvent or by distillation. Both when the present process is carried out in two stages and when sulfonation and reaction with the acid chloride are carried out simultaneously, it is always necessary to ensure that not more than 2 mol of sulfonating agent are used per 250 g of polyisocyanate, in the former case, before the acid chloride is added.

The reaction with the acid chloride (i.e., the action of the acid chloride on the previously formed sulfonic acid in the case of a two-stage reaction or the action of the acid chloride and sulfonating agent on the di- or higher polyisocyanate in the case of a one-stage reaction), is generally carried out at temperatures of from 0° to 160° C., preferably from 5° to 100° C. According to a particularly preferred embodiment of the present process, sulfonating agent and acid chloride are added at from ca. 20° to 30° C. and the temperature is gradually raised to ca. 80° C. The reaction is continued until no more hydrogen chloride is evolved from the reaction mixture. Removal of the hydrogen chloride may also be accelerated by the introduction of carbon dioxide or nitrogen.

Any solvent or excess acid chloride remaining after the reaction is removed by distillation. The polyisocyanate or polyisocyanate mixture containing chlorosulfonyl groups is present in the liquid residue which is sufficiently pure for most purposes. Any specific compounds contained in it generally separate by crystallization.

Apart from recrystallization or fractional solution or precipitation, further purification of the product, if desired, may in most cases be carried out by digestion with toluene. Insoluble constituents (frequently traces of uretdione sulfonic acid) are removed by filtration, and the toluene is distilled off under vacuum and the product dried in a high vacuum. It is, however, a particular advantage of the present process that a separate stage of purification is frequently unnecessary.

It is surprising that the present process may be carried out at relatively low temperatures to provide high yields, since the sulfonation of isocyanates generally leads to highly thermostable dimers and if these are formed as intermediate products, both the uretdione ring and the carbamic acid chloride formed as an intermediate stage must be broken down again. Only few by-products are formed apart from hydrogen chloride. It is a particular advantage of the present process that derivatives of polyisocyanates or polyisocyanate mixtures containing chlorosulfonyl groups may easily be obtained from the corresponding polyisocyanates or polyisocyanate mixtures which have been produced on a large technical scale.

These derivatives are valuable starting materials for the production of polyisocyanate polyaddition products.

In particular, the polyurethanes produced therefrom have improved fire characteristics compared with those of the corresponding polyurethanes obtained from simple, unmodified polyisocyanates. The products according to the present invention are also valuable starting materials for the preparation of other modified polyisocyanates, e.g., the corresponding isocyanato aryl sulfonic acid esters.

EXAMPLE 1

40 g (0.5 m) of gaseous sulfur trioxide diluted with nitrogen as carrier gas are passed into a solution of 125 g (0.5 m) of 4,4'-diisocyanato diphenyl methane in 800 ml of dehydrated 1,2-dichloroethane at from 5° to 10° C. The reaction mixture is left to equilibrate to room temperature and the dichloroethane is then distilled off. The crystalline paste remaining is taken up in 400 ml of thionylchloride (ca. 5.5 mol), and 6.5 g of dimethyl formamide are slowly added at room temperature. The reaction mixture is then heated to 80° C. and maintained at this temperature until the evolution of hydrogen chloride has ceased.

The reaction solution is then almost clear. After removal of ca. 1.5 g of residue by filtration, the thionyl chloride is distilled off under vacuum. 152 g of crude product are obtained. After vigorous drying, it has a sulfur content of 8.4% (calculated: 9.19%).

The crude product is treated with 100 ml of absolute toluene at from 60° to 70° C. for further purification. It is left to stand overnight and filtered to remove insoluble constituents. After removal of the toluene by distillation, 132 g (76% of the theoretical yield) of 4,4'-diisocyanato-3-chlorosulfonyl-diphenyl methane, Mp from 98° to 103° C., are obtained.

The sulfochloride group content is 28.5%, by weight.

EXAMPLE 1a 4 g of 4,4'-diisocyanato-3-chlorosulfonyl-diphenyl methane obtained in Example 1 are added as a solution in 8 ml of acetonitrile to a mixture of 50 ml of ice and 50 ml of a 51% dimethylamine solution. After ca. 15 minutes, the reaction mixture is diluted with water and the product is separated by suction filtration and recrystallized from aqueous ethanol.

A white, well crystallized derivative melting at from 162° to 163° C. is obtained. According to the IR spectrum and nuclear magnetic resonance spectrum, as well as according to the field desorbtion spectrum it has the following constitution:

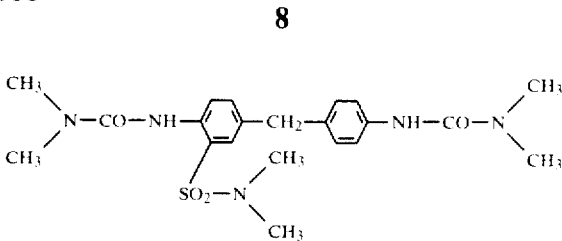

This shows that the bis-urea-monosulfonamide derivative of the 4,4'-diisocyanato-3-chlorosulfonyl diphenyl methane according to the present invention has been formed.

Elemental Analysis: $C_{21}H_{29}N_5O_4S$ (441): Calculated: C 56.42%, H 6.54%, N 15.67%, S 7.17%; Observed: C 56.2%, H 6.4%, N 15.75%, S 7.3%.

EXAMPLE 2

The procedure is the same as in Example 1, except that 82 g (1.03 mol) of sulfur trioxide are now introduced. After removal of dichloroethane by distillation, a white, solid product is obtained, to which 440 ml (ca. 6 mol) of thionyl chloride are added. Evolution of hydrogen chloride is achieved at reflux by the portionwise addition of a total of 6.6 g of dimethyl formamide. The excess of thionyl chloride is distilled off and toluene is added to the residue twice, each time using 650 ml of toluene at ca. 80° C. 169 g of crude product (75% of the theoretical yield) are obtained after removal of the toluene by distillation.

(I)

The mass spectrum of a sample indicates the presence of 4,4'-diisocyanato-3,3'-bis-chlorosulfonyl-diphenyl methane according to the present invention as the main component in addition to traces of 4,4'-diisocyanato-3-chlorosulfonyldiphenyl methane.

(II)

Further purification may be carried out by fractional crystallization from absolute toluene. The monochlorosulfonyl compound is more highly soluble in toluene than the bis-chlorosulfonyl compound. Pure 4,4'-diisocyanato-3,3'-bis-chlorosulfonyl-diphenyl methane is thus obtained as white crystals melting at from 160° to 162° C.

The sulfochloride group content is 44.4%, by weight.

(III)

Elemental analysis: $C_{15}H_8N_2O_6S_2Cl_2$ (448): Calculated: C 40.19%, H 2.02%, N 6.25%, S 14.30%; Observed: C 40.4%, H 1.8%, N 6.35%, S 14.5%.

EXAMPLE 2a 5 g of crude 4,4'-diisocyanato-3,3'-bis-chlorosulfonyl-diphenyl methane obtained in Example 2, dissolved in a small quantity of warm acetonitrile, are introduced into a mixture of 50 ml of crushed ice and 50 ml of a 51% dimethylamine solution. The reaction mixture is diluted with water after ca. 15 minutes, suction filtered and recrystallized from aqueous ethanol. White crystals melting at from 163° to 164° C. are obtained. According to the IR, NMR and field desorbtion spectra, the compound obtained is the bis-urea-bis-sulfonamide derivative of the 4,4'-diisocyanato-3,3'-bis-chlorosulfonyl-diphenyl methane according to the present invention, corresponding to the following formula:

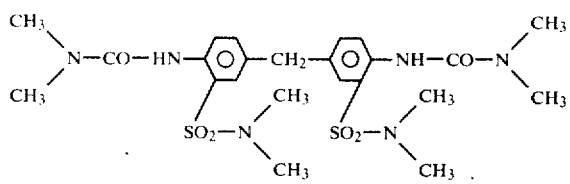

Elemental analysis: $C_{23}H_{37}N_6O_6S_2$ (554): Calculated: C 49.82%, H 6.18%, N 15.16%: Observed: C 49.70%, H 6.20%, N 15.15%.

EXAMPLE 3

Diisocyanatodiphenyl methane is distilled off the crude phosgenation product of an aniline/formaldehyde condensate until its viscosity is 200±20 cp at 25° C. (dinuclear content: 44.3% by weight; trinuclear content: 23.5%, by weight; higher nuclear content: 32.2%, by weight).

500 g of this polyisocyanate are sulfonated with 8.8 g (0.11 mol) of sulfur trioxide at from 5° to 10° C. A sulfonation product having a sulfur content of 0.7% is obtained. The product has a viscosity (25° C.) of 1050 cps and an isocyanate content of 29.5%, by weight, NCO. 119 g of thionyl chloride are added to 460 g (0.1 equivalent, $SO_3H$ groups) of this sulfonated polyisocyanate and the reaction mixture is maintained at 80° C. for 2.5 hours while 1.4 g of dimethyl formamide in 10 ml of toluene are gradually added drop-wise. All the thionyl chloride is distilled off in a powerful water jet vacuum and the deep brown, but clear crude product is obtained.

| Data: | Viscosity (25° C.): | 2800 cp |
| --- | --- | --- |
| | NCO | 30.9% (uncorrected) |
| | % Cl | 0.68 |
| | % S | 0.76 |

The chlorosulfonyl group content calculated from elemental analysis is 2.3%, by weight, (theoretical: 2.19%).

EXAMPLE 4

The procedure is completely analogous to that of Example 1, but using 52 g of $SO_3$. 139 g of crude product are obtained after removal of the thionyl chloride by distillation and taking up of the residue in 800 ml of absolute toluene (80° C.), filtration and removal of the toluene by distillation.

The mass spectrum indicates approximately equal quantities of 4,4'-diisocyanato-3-chlorosulfonyl-diphenyl methane and 4,4'-diisocyanato-3,3'-bis-chlorosulfonyl-diphenyl methane in addition to traces of 4,4'-diisocyanatodiphenyl methane. In the IR spectrum, the isocyanate groups appear at 2,280 cm$^{-1}$ and the $SO_2$ Cl groups at 1370 and 1170 cm$^{-1}$.

The chlorosulfonyl group content is 36.8%, by weight, (according to elemental analysis).

EXAMPLE 5

62.5 g (0.25 m) of 2,2'-diisocyanatodiphenyl methane are dissolved in 300 ml of anhydrous 1,2-dichloroethane at room temperature and then sulfonated with 64.1 g (0.55 m) of chlorosulfonic acid in 100 ml of dichloroethane at from 5° to 10° C.

The yellow solution at first becomes reddish brown and a yellowish brown oil separates from it after ca. half the quantity of chlorosulfonic acid has been put into the process. The reaction mixture is finally heated at reflux (ca. 80° C.) and, after 2 hours, the remaining hydrogen chloride is driven off with nitrogen for a further 2 hours. The solvent is subsequently removed under vacuum. 102 g of the uretdione disulfonic acid of 2,2'-diisocyanatodiphenyl methane are obtained.

Sulfur content: Calculated: 15.6% S: Observed: 15.5% S.

The disulfonic acid is taken up with 400 ml (5.5 mol) of thionyl chloride without further purification, and a mixture of 2.5 g of DMF and 5 g of pyridine is added at room temperature. The reaction mixture is slowly heated to ca. 75° C., the brownish yellow suspension slowly dissolving to form a deep brown, almost completely clear solution. Rapid evolution of hydrogen chloride begins at ca. 40° C. and is completed after ca. 2.5 hours. After the removal of traces of undissolved material by filtration, the excess thionyl chloride is distilled off in a water jet vacuum. The crude product is taken up with ca. 400 ml of absolute toluene at 75° C., and the filtered solution in toluene is evaporated until dry.

87 g of 5,5'-bis-chlorosulfonyl-2,2'-diisocyanatodiphenyl methane still containing ca. 5% of 5-monochlorosulfonyl-2,2'-diisocyanatodiphenyl methane are obtained. Melting point of crude product: 102°–118° C.

| Elemental analysis: for $C_{15}H_8N_2O_6S_2Cl_2$: | | |
| --- | --- | --- |
| | % Cl | % S | % N |
| Calculated | 15.53 | 14.05 | 6.36 |
| Observed | 15.82 | 14.30 | 6.25 |

According to the NMR and IR spectra, as well as the field desorbtion spectrum, the product corresponds to the following formula:

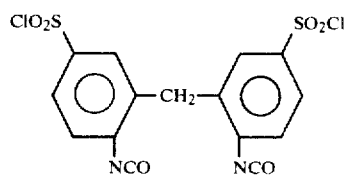

The chlorosulfonyl group content is 44.4%, by weight.

A derivative prepared according to Example 1a (bis-urea-bis-sulfonamide) has a melting point of from 118° to 121° C. after recrystallization from aqueous ethanol.

It has the following constitution confirmed analytically:

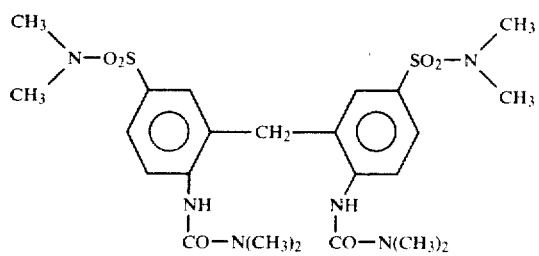

What is claimed is:

1. A substituted polyisocyanate, or mixture of substituted polyisocyanates, of the diphenyl methane series, characterized by containing from 2 to 50%, by weight, of chlorosulfonyl groups.

2. Diisocyanates containing chlorosulfonyl groups according to claim 1, corresponding to the following general formula:

(OCN)$_2$R(SO$_2$Cl)$_n$ wherein
R represents a hydrocarbon group as obtained by the removal of two isocyanate groups and n hydrogen atoms from a diisocyanatodiphenyl methane or an isomeric mixture of diisocyanatodiphenyl methanes; and
n represents 1 or 2.

3. A diisocyanate of claim 1, corresponding to the following formula:

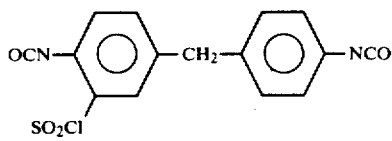

4. A diisocyanate of claim 1, corresponding to the following formula:

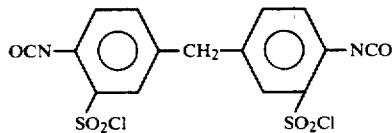

5. A process for the preparation of a substituted polyisocyanate or polyisocyanate mixture, comprising reacting (a) a polyisocyanate, or polyisocyanate mixture of the diphenyl methane series containing at least two isocyanate groups at from 0° to 160° C.; with (b) from 0.2 to 2.2 mol of sulfur trioxide or chlorosulfonic acid per 250 g of the polyisocyanate put into the process; and (c) from 0.3 to 22 mol of an inorganic acid chloride per 250 g of polyisocyanate put into the process.

6. The process of claim 5, wherein said polyisocyanate is selected from the group consisting of 2,2'-diisocyanatodiphenyl methane; 2,4'-diisocyanato-diphenyl methane; 4,4'-diisocyanato-diphenyl methane; and mixtures thereof.

7. The process of claim 5, wherein said inorganic acid chloride is selected from the group consisting of thionyl chloride, sulfuryl chloride, phosphorous pentachloride, sulfur chloride and phosgene.

8. The process of claim 5, wherein said reaction is conducted in the presence of catalyst.

9. The process of claim 8, wherein said catalyst is used in an amount of 2 to 40 g per mol of sulfonating agent.

10. The process of claim 5, wherein, if chlorosulfonic acid is used as component (b), the resulting hydrogen chloride is removed from the resulting product.

11. The process of claim 5, wherein said polyisocyanate mixture contains 30 to 95%, by weight, of diisocyanate diphenyl methane isomers and 5 to 70% of higher functional polyisocyanates of the diphenyl methane series.

12. The process of claim 11, wherein said polyisocyanate mixture contains 40 to 85%, by weight, of diisocyanate diphenyl methane isomers and 15 to 60% of higher functional polyisocyanates of the diphenyl methane series.

13. A process for the preparation of polyisocyanate polyaddition compounds, comprising reacting
(A) a diisocyanate, or diisocyanate mixtures, of the formula:

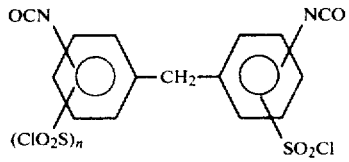

wherein n is 0 or 1; and
(B) an isocyanate-reactive compound.

* * * * *